Sept. 9, 1941.  J. W. FOLEY  2,255,035
ROLLER BEARING
Filed Dec. 9, 1940
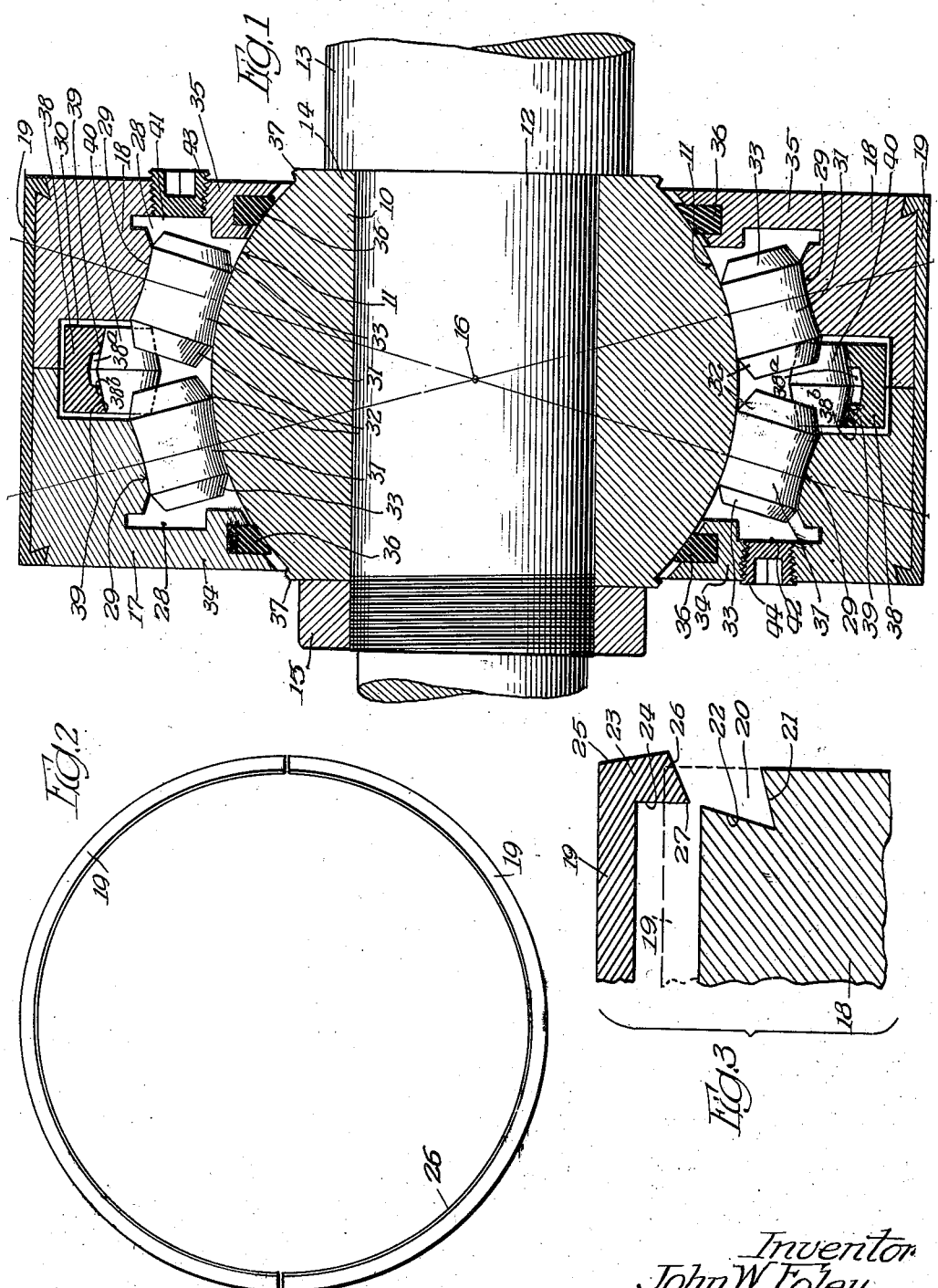
Inventor
John W. Foley
By [signature]
Atty.

Patented Sept. 9, 1941

2,255,035

UNITED STATES PATENT OFFICE 2,255,035

ROLLER BEARING

John W. Foley, Chicago, Ill.

Application December 9, 1940, Serial No. 369,308

5 Claims. (Cl. 308—206)

This invention relates to improvements in roller bearings and one of the objects of the same is to provide an improved roller bearing wherein the rollers are of a tapered construction, the periphery of each of which is concaved to conform to the contour of convexed bearing surfaces of the inner and outer bearing or race members and in which the extremities of the rollers overlie or project beyond the point of contact of the rollers of the bearing surfaces, whereby to provide a reinforcement or protection of the ends of the rollers to prevent the crushing or breaking down of the metal or material at the ends of the roller, when load contact creates a pressure thereupon.

A further object is to provide an improved bearing of this character in which the outer ring or bearing member is of a sectional construction, and improved means for securing the sections together.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a longitudinal sectional view of a bearing of this character constructed in accordance with the principles of this invention.

Figure 2 is a side elevation of the sectional ring for securing the outer bearing members together.

Figure 3 is an enlarged detail fragmentary view of a portion of one of the outer bearing members and of the securing members.

Referring more particularly to the drawing, the numeral 10 designates generally an inner bearing member which is provided with an outer convexed surface 11 which is formed on an arc extending lengthwise of the axis thereof, and this bearing member may be mounted upon a reduced end 12 of a shaft 13 and abuts a shoulder 14. The bearing member is held against displacement preferably by a nut or collar 15 threaded upon a portion of the shaft and cooperates with the shoulder 14.

The periphery of the bearing member is formed on an arc described from the diametric center 16 of the bearing member.

An outer annular bearing member encompasses the bearing member 10 and this outer bearing member is formed of two sections 17—18 abutting each other and the sections are held together preferably by means of two semi-circular channel shaped members 19 which are preferably formed of a ductile material.

Each of the members 17—18 is provided in its periphery adjacent the outer surface thereof with a recess 20, the bottom 21 of which is inclined downwardly and inwardly and the inner wall 22 of the recess extends downwardly and inwardly terminating adjacent the bottom wall 21.

The walls 23 of the members 19 are provided with a straight inner wall 24 and an outwardly inclined wall 25, and the extremity 26 of each of these walls inclines downwardly and inwardly terminating in a point 27 at the junction with the wall 24.

The area of the space between the walls 24 of the member 19 is such that when the members 17—18 are assembled, the wall 24 will pass the adjacent extremity of the wall 22 so that the ends 23 of the member 19 will enter the recess 20 until the extremity 27 of the bottom of the walls 23 contact the bottom 21 of the recess 20. A further pressure or forcing of the member 19 into position causes the wall 23 of the channel member to assume a configuration to conform to the contour of the recess 20 and so that a portion of the wall 23 will be forced into close contact with the wall 22 of the recess.

These members 19 being of ductile material may be readily removed when it is desired to separate the bearing members 18.

Each of the bearing members 17—18 is so shaped that when they are assembled and secured together by the securing element 19 there will be formed a recess 28 in proximity to the bearing surface 11 of the member 10 and the surfaces 29 of the wall of the recess are convexed and are formed on arcs described on the same radius and from a point in alinement with the point 16 on such radius, the contact surfaces 29 in the members 17—18 terminate short of each other.

A recess 30 is formed between the members 17—18 for a purpose to be described. Each of the rollers 31 is provided with a concaved periphery the concaved surface terminating short of the extremities of the roller and the arc of the concavity conforms in contour to the surfaces 11 and 29 respectively of the bearing member 10 and the respective outer bearing members 17—18. The rollers are of a length that the extremities thereof will project beyond the bearing surfaces, and these extremities are respectively tapered as at 32—33 and project into the recess 28. This construction provides an extra amount of material at the end of the rollers beyond their contact points with the bearing surfaces, and is provided for the purpose of reinforcing the ends of the rollers and lessening the possibility of crushing or breaking down of the metal at the ends of the rollers at these bearing points when load contact exerts pressure thereupon.

Furthermore, these tapered extremities will serve as a means for facilitating lubrication.

The walls 34—35 of the outer bearing member terminate short of the surface 11 of the inner bearing member 10 and packing 36 may be provided in the extremities of these walls to prevent the entrance of foreign matter into the recess 28 and to maintain the lubricant against escape.

Stops or projections 37 may be provided on the inner bearing member 10 so that when the outer bearing ring 17—18 and the inner bearing 10 and shaft 13 are angularly displaced with each other such angular displacement will be limited by the stops to prevent separation of the parts yet providing a self-alining bearing.

Within the recess 30 in the outer bearing member is an annular ring or bearing member 38, the inner surface of which is inclined downwardly from the central point thereof and against such surface 39 double conical rollers 40 rest. These rollers 40 are disposed between adjacent pairs of rollers 31 and contact the tapered or beveled portions 32 at the proximate ends of adjacent and opposite rollers and serve the purpose of maintaining the rollers 31 in proper spaced relation.

With this construction the bearing ring or member 38 will be floating but the rollers 40 will have a constant rolling contact therewith and also with portions of the respective adjacent rollers 31.

A lubrication opening 41 may be provided through one of the walls 34—35 of the outer bearing member and a similar lubrication opening 42 may be provided through such walls but on the opposite side from the first lubrication opening. These openings may be respectively closed by suitable removable closures 43—44.

These closures may be removed in order to permit of the insertion of a lubricant into the recess or chamber 28. When it is desired to clean the bearing and to remove the lubricant, the closures 43—44 and the contents of the recess or chamber 28 may be forced therefrom by directing fluid under pressure through the opening 41, thereby forcing the lubricant out through the other of the openings 42.

In the present invention the extremities 32—33 of the rollers will be maintained out of contact with the bearing surfaces 11—29 and the rollers 31 being of concave shape will cooperate with the convexed bearing surfaces 11—29, will assist in maintaining the rollers against longitudinal shifting movement with respect to their bearing surfaces under abnormal conditions. When the bearing member 10 or the outer bearing members 17—18 are angularly displaced one with respect to the other, there will be a relative movement of the rollers 31 and the bearing surfaces 29 or 11 one with relation to the other in directions lengthwise with respect to the longitudinal axis of the rollers 31.

By the provision of the concaved surface of the rollers 31 which engage the convexed bearing surface 11 and the respective surfaces 29, these rollers will be maintained in proper position between such bearing surfaces without a wedging action, thereby materially reducing friction.

The annular floating ring 38 is provided with a cut-away portion 38a to provide bearing surfaces 38b for the rollers 40, and these surfaces 38b are substantially equal to the bearing surfaces of the rollers 40 against the proximate tapered ends of the rollers 31.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A roller bearing embodying an inner and an annular outer bearing member, rollers between said members, the bearing surfaces of said members being convexed in directions lengthwise of the axis of the bearing, the said rollers being tapered and provided with a concave periphery contacting said surfaces, the extremities of the rollers overhanging and out of contact with said surfaces and being tapered in directions towards the extremities of the rollers, an annular floating bearing member encompassing and spaced from the proximate ends of the adjacent rollers, rollers contacting said floating member and the tapered ends of the adjacent first said rollers, the outer bearing member being of sectional construction, and means for securing said sections together.

2. A roller bearing embodying an inner and an annular outer bearing member, rollers between said members, the bearing surfaces of said members being convexed in directions lengthwise of the axis of the bearing, the said rollers being tapered and provided with a concave periphery contacting said surface, the extremities of the rollers overhanging and out of contact with said surfaces and being tapered in directions towards the extremities of the rollers, an annular floating bearing member encompassing and spaced from the proximate ends of the adjacent rollers, rollers contacting said floating member and the tapered ends of the adjacent first said rollers, the outer bearing member being of sectional construction, and means for securing said sections together, the rollers which have contact with the said floating member and the adjacent ends of the first said rollers being tapered from the longitudinal center thereof in opposite directions towards the ends thereof.

3. A roller bearing embodying an inner and an annular outer bearing member, rollers between said members, the bearing surfaces of said members being convexed in directions lengthwise of the axis of the bearing, the said rollers being tapered and provided with a concave periphery contacting said surface, the extremities of the rollers overhanging and out of contact with said surfaces and being tapered in directions towards the extremities of the rollers, an annular floating bearing member encompassing and spaced from the proximate ends of the adjacent rollers, rollers contacting said floating member and the tapered ends of the adjacent first said rollers, the outer bearing member being of sectional construction, and means for securing said sections together, the bearing surfaces on the inner face of the outer bearing member being laterally spaced from each other, and the said rollers which contact the said floating bearing member being disposed in the space between the last said bearing surfaces.

4. A roller bearing embodying an inner and an annular outer bearing member, rollers between said members, the bearing surfaces of said members being convexed in directions lengthwise of the axis of the bearing, the said rollers being tapered and provided with a concave periphery contacting said surface, the extremities of the rollers overhanging and out of contact with said surfaces and being tapered in directions towards the extremities of the rollers, an annular floating bearing member encompassing and spaced from the proximate ends of the adjacent rollers, rollers contacting said floating member and the tapered ends of the adjacent first said rollers, the outer bearing member being of sectional construction, and means for securing said sections together, the said securing means being of channel formation and extending substantialy across the outer periphery of the outer bearing member and disposed within the planes of the lateral faces of said outer bearing member.

5. A roller bearing embodying an inner and an annular outer bearing member, rollers between said members, the bearing surfaces of said members being convexed in directions lengthwise of the axis of the bearing, the said rollers being tapered and provided with a concave periphery contacting said surface, the extremities of the rollers overhanging and out of contact with said surfaces and being tapered in directions towards the extremities of the rollers, an annular floating bearing member encompassing and spaced from the proximate ends of the adjacent rollers, rollers contacting said floating member and the tapered ends of the adjacent first said rollers, the outer bearing member being of sectional construction, and means for securing said sections together, the bearing surfaces of the inner and outer bearing members being described on the same radius.

JOHN W. FOLEY.